United States Patent
Merlin et al.

(10) Patent No.: US 9,288,009 B2
(45) Date of Patent: Mar. 15, 2016

(54) MODULATION CODING SCHEME SELECTION FOR RESPONSE FRAMES IN CASE OF TRANSMIT POWER IMBALANCE

(71) Applicant: QUALCOMM Incorporated, San Diego, CA (US)

(72) Inventors: Simone Merlin, San Diego, CA (US); Amin Jafarian, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 283 days.

(21) Appl. No.: 13/936,994

(22) Filed: Jul. 8, 2013

(65) Prior Publication Data

US 2014/0010158 A1   Jan. 9, 2014

Related U.S. Application Data

(60) Provisional application No. 61/669,601, filed on Jul. 9, 2012.

(51) Int. Cl.
*H04L 12/811* (2013.01)
*H04L 1/00* (2006.01)

(52) U.S. Cl.
CPC ............ *H04L 1/0015* (2013.01); *H04L 1/0034* (2013.01)

(58) Field of Classification Search
CPC . H04L 27/0012; H04L 1/0015; H04L 1/0034; H04W 84/12; H04W 84/02; H04W 72/02; H04W 52/246; H04W 88/02; H04W 72/0413; H04W 72/1268; H04W 52/262; H04W 72/08
See application file for complete search history.

(56) References Cited

U.S. PATENT DOCUMENTS

| | | | |
|---|---|---|---|
| 7,047,032 B2 | 5/2006 | Yun | |
| 7,126,996 B2 | 10/2006 | Classon et al. | |
| 8,310,981 B2 | 11/2012 | Damnjanovic et al. | |
| 2004/0057507 A1* | 3/2004 | Rotstein et al. | 375/219 |
| 2004/0209579 A1 | 10/2004 | Vaidyanathan | |
| 2009/0138774 A1* | 5/2009 | Singh et al. | 714/748 |
| 2010/0009689 A1* | 1/2010 | Jalloul | H04L 1/0003 455/450 |
| 2010/0254322 A1 | 10/2010 | Liao et al. | |
| 2011/0080877 A1 | 4/2011 | Nentwig | |
| 2012/0106531 A1* | 5/2012 | Seok | H04B 7/0452 370/338 |
| 2012/0276896 A1* | 11/2012 | Ren | H04L 1/0003 455/423 |
| 2012/0294255 A1* | 11/2012 | Seok et al. | 370/329 |
| 2013/0010844 A1* | 1/2013 | Amini et al. | 375/219 |
| 2013/0107868 A1 | 5/2013 | Sadek et al. | |

FOREIGN PATENT DOCUMENTS

EP   2544394 A2   1/2013

OTHER PUBLICATIONS

International Search Report and Written Opinion—PCT/US2013/049729—ISA/EPO—Sep. 9, 2013.

(Continued)

*Primary Examiner* — Gary Mui
*Assistant Examiner* — Michael Phillips
(74) *Attorney, Agent, or Firm* — Knobbe Martens Olson & Bear LLP

(57) ABSTRACT

Certain aspects of the present disclosure relate to a technique for selecting modulation coding schemes (MCS). In some aspects, the MCS is selected based on a characteristic of an electronic device and the MCS of a transmitter. In some aspects, the MCS is selected based on a power imbalance between an access point and a user terminal.

34 Claims, 8 Drawing Sheets

(56) References Cited

OTHER PUBLICATIONS

Liu J., et al. (MEDIATEK): "Open-Loop Link Margin Index for fast link adaptation; 11-12-0645-01-00ah-open-loop-linke-magin-index-for-fast-link-adaptation", IEEE SA Mentor; 11-12-0645-01-00AH-Open-Loop_Linke-Magin-Index-For-Fast-Link-Adaptation, IEEE-SA Mentor, Piscataway, NJ USA, vol. 802.11ah, No. 2, May 14, 2012, pp. 1-11, XP068039133 [retrieved on May 14, 2012].

Yeow W. L., et al. (12R): "Block ACK Transmission; 11-12-0662-02-00ah_block-ack-transmission", IEEE Draft; 11-12-0662-02-00AH-Block-ACK-Transmission, IEEE-SA Mentor, Piscataway, NJ USA, vol. 802.11ah,No. 2, May 15, 2012, pp. 1-14, XP017671822 [retrieved on May 15, 2012].

* cited by examiner

MODULATION CODING SCHEME SELECTION FOR RESPONSE FRAMES IN CASE OF TRANSMIT POWER IMBALANCE

CROSS REFERENCE TO RELATED APPLICATIONS

This application claims priority to U.S. Provisional No. 61/669,601, titled "MODULATION CODING SCHEME SELECTION FOR RESPONSE FRAMES IN CASE OF TRANSMIT POWER IMBALANCE," filed Jul. 9, 2012, which is hereby incorporated by reference in its entirety.

BACKGROUND

1. Field

Certain aspects of the present disclosure generally relate to wireless communications and, more particularly, to systems and methods for communicating the set of modulation coding scheme (MCS) that is supported by a device in a wireless communications network.

2. Background

In order to address the issue of increasing bandwidth requirements demanded for wireless communications systems, different schemes are being developed to allow multiple user terminals to communicate with a single access point by sharing the channel resources while achieving high data throughputs. Multiple Input Multiple Output (MIMO) technology represents one such approach that has recently emerged as a popular technique for next generation communication systems. MIMO technology has been adopted in several emerging wireless communication standards such as the Institute of Electrical and Electronics Engineers (IEEE) 802.11 standard. The IEEE 802.11 denotes a set of Wireless Local Area Network (WLAN) air interface standards developed by the IEEE 802.11 committee for short-range communications (e.g., tens of meters to a few hundred meters).

A MIMO system employs multiple ($N_T$) transmit antennas and multiple ($N_R$) receive antennas for data transmission. A MIMO channel formed by the $N_T$ transmit and $N_R$ receive antennas may be decomposed into $N_S$ independent channels, which are also referred to as spatial channels, where $N_S \leq \min\{N_T, N_R\}$. Each of the $N_S$ independent channels corresponds to a dimension. The MIMO system can provide improved performance (e.g., higher throughput and/or greater reliability) if the additional dimensionalities created by the multiple transmit and receive antennas are utilized.

In wireless networks with a single Access Point (AP) and multiple user stations (STAs), concurrent transmissions may occur on multiple channels toward different stations, both in the uplink and downlink direction. In wireless networks employing an IEEE 802.11ah standard, APs and STAs may have different transmit power capabilities. Many challenges are present in such systems.

SUMMARY

Some aspects of the present disclosure include a method for communicating in a wireless network by an electronic device, the method comprising receiving data identifying a first modulation scheme from a transmitter; selecting a second modulation coding scheme based on the characteristic of the electronic device and the first modulation coding scheme; and transmitting data identifying the selected second modulation coding scheme.

In some aspects the second modulation coding scheme is a predetermined quantity lower than the first modulation coding scheme.

In some aspects receiving data identifying a first modulation scheme comprises receiving an indication of transmit power of the transmitter in a field element at the time of association; and the predetermined quantity is a function of the difference between the indicated transmit power of the transmitter and transmit power of the electronic device.

In some aspects, the electronic device receives the predetermined quantity from the transmitter.

In some aspects, the electronic device receives the predetermined quantity in an association request frame.

In some aspects, the electronic device receives the predetermined quantity in a management frame sent after association.

In some aspects, the electronic device provides the predetermined quantity.

In some aspects, the second modulation coding scheme does not exceed a predetermined quantity.

In some aspects, the predetermined quantity is a datarate or modulation code scheme order.

In some aspects, receiving data identifying a first modulation scheme comprises receiving an indication of transmit power of the transmitter in a field element at the time of association; and the predetermined quantity is a function of the difference between the indicated transmit power of the transmitter and transmit power of the electronic device.

In some aspects, the electronic device receives the predetermined quantity from the transmitter.

In some aspects, the electronic device receives the predetermined quantity in an association request frame.

In some aspects, the electronic device receives the predetermined quantity in a management frame sent after association.

In some aspects, the electronic device provides the predetermined quantity.

In some aspects, selecting the second modulation coding scheme comprises determining a power imbalance between the transmitter and the electronic device, determining an allowable modulation coding scheme for the electronic device based on the determined power imbalance, and selecting the allowable modulation scheme for the second transmitter.

Some aspects of the present disclosure include an apparatus for communicating in a wireless network by an electronic device comprising a transceiver configured to receive data identifying a first modulation coding scheme, a processing system configured to select a second modulation coding scheme based on the characteristics of the electronic device and the first modulation coding scheme, and wherein the transceiver is configured to transmit and/or receive data identifying the selected modulation coding scheme.

In some aspects, the second modulation coding scheme is a predetermined quantity lower than the first modulation coding scheme.

In some aspects, the transceiver is further configured to receive an indication of transmit power. The processing system is further configured to determine the predetermined quantity as a function of the difference between the indicated transmit power of the transmitter and the transmit power of the electronic device.

In some aspects, the electronic device is configured to receive the predetermined quantity from the transmitter.

In some aspects, the electronic device is configured to receive the predetermined quantity in an association request frame.

In some aspects, the electronic device is configured to receive the predetermined quantity in a management frame sent after association.

In some aspects, the electronic device is configured to provide the predetermined quantity.

In some aspects, the second modulation coding scheme does not exceed a predetermined quantity.

In some aspects, the predetermined quantity is a datarate or modulation code scheme order.

In some aspects, the transceiver is further configured to receive an indication of transmit power of the transmitter in a field element at the time of association. The processing system is further configured to determine the predetermined quantity as a function of the difference between the indicated transmit power of the transmitter and the transmit power of the electronic device.

In some aspects, the electronic device receives the predetermined quantity from the transmitter.

In some aspects, the electronic device is configured to receive the predetermined quantity in an association request frame.

In some aspects, the electronic device is configured to receive the predetermined quantity in a management frame sent after association.

In some aspects, the electronic device is configured to provide the predetermined quantity.

In some aspects, the processor is further configured to determine a power imbalance between the transmitter and the electronic device, determine an allowable modulation coding scheme for the second transmitter based on the power imbalance, and select the allowable modulation scheme for the electronic device.

In some aspects, the electronic device receives the allowable modulation coding scheme from the transmitter.

Some aspects of the present disclosure include an apparatus for communicating in a wireless network by an electronic device, comprising means for receiving data identifying a first modulation coding scheme, means for selecting a second modulation coding scheme for a second transmitter based on the characteristics of the electronic device and the first modulation coding scheme, and means for communicating using the selected modulation coding scheme.

In some aspects, the second modulation coding scheme is a predetermined quantity lower than the first modulation coding scheme.

In some aspects, the apparatus further comprises means for receiving an indication of transmit power of the transmitter in a field element at the time of association.

In some aspects, the second modulation coding scheme does not exceed a predetermined quantity.

Some aspects of the present disclosure include a method for communicating in a wireless network by an electronic device, the method comprising transmitting data identifying a first modulation scheme, determining a transmit power imbalance, transmitting data identifying a set of allowable modulation coding schemes based on the determined transmit power imbalance, and receiving data identifying a second modulation coding scheme selected from the set of allowable modulation coding schemes.

In some aspects, data identifying a first modulation scheme is transmitted in an association request or response frame.

In some aspects, data identifying a first modulation scheme is transmitted in management frame sent after association.

Some aspects of the present disclosure include a non-transitory computer-readable medium comprising code that, when executed, causes an apparatus to receive data identifying a first modulation scheme from a transmitter, select a second modulation coding scheme based on the characteristic of the electronic device and the first modulation coding scheme; and transmit data identifying the selected modulation coding scheme.

Some aspects of the present disclosure include a method for communicating in a wireless network, the method comprising transmitting data according to a first modulation coding scheme; receiving the transmitted data, determining a power imbalance based on the transmitted data; selecting a second modulation coding scheme which is lower than the first modulation coding scheme by the predetermined quantity, and communicating using the selected modulation coding scheme.

Some aspects of the present disclosure include a method for communicating in a wireless network by an electronic device, the method comprising receiving data identifying a first modulation coding scheme from a transmitter, selecting a second modulation coding scheme based on a characteristic of the electronic device including the first modulation coding scheme, wherein information identifying the second modulation coding scheme is a predetermined quantity lower than the first modulation coding scheme; and transmitting data identifying the second modulation coding scheme.

Some aspects of the present disclosure include an apparatus for communicating in a wireless network by an electronic device comprising a transceiver configured to receive data identifying a first modulation coding scheme, a processing system configured to select a second modulation coding scheme based on a characteristic of the electronic device including the first modulation coding scheme, wherein information identifying the second modulation coding scheme is a predetermined quantity lower than the first modulation coding scheme, and wherein the transceiver is configured to transmit and/or receive data identifying the second modulation coding scheme.

Some aspects of the present disclosure include an apparatus for communicating in a wireless network by an electronic device comprising means for receiving data identifying a first modulation coding scheme from a transmitter, means for selecting a second modulation coding scheme based on a characteristic of the electronic device including the first modulation coding scheme, wherein information identifying the second modulation coding is a predetermined quantity lower than the first modulation coding scheme, and means for communicating using the second modulation coding scheme.

Some aspects of the present disclosure include a non-transitory computer-readable medium comprising code that, when executed, causes an apparatus to receive data identifying a first modulation coding scheme from a transmitter, select a second modulation coding scheme based on a characteristic of the electronic device including the first modulation coding scheme, wherein information identifying the second modulation coding is a predetermined quantity lower than the first modulation coding scheme, and transmit data identifying the second modulation coding scheme.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects.

DETAILED DESCRIPTION

Figure 1:
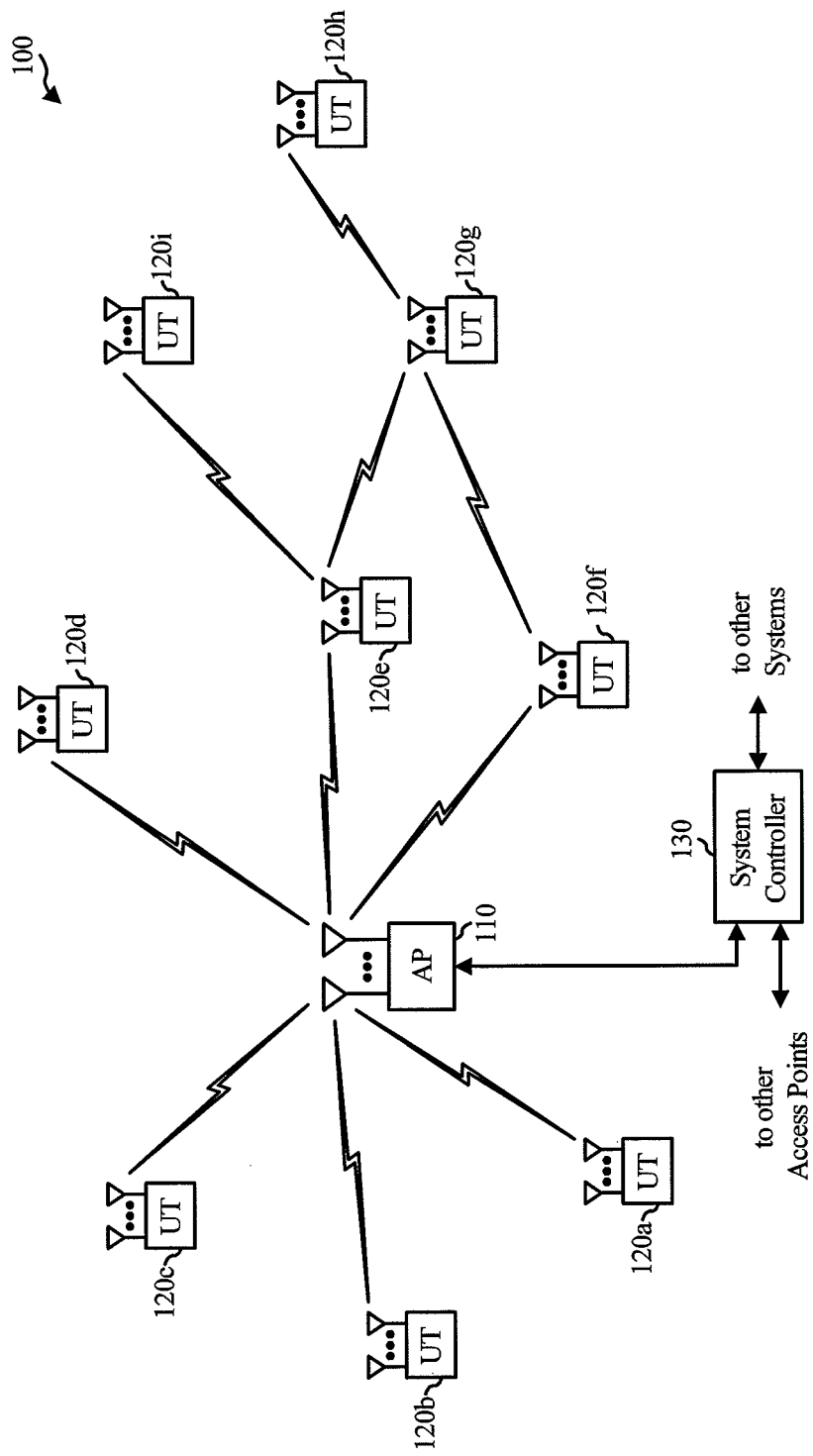
FIG. 1 illustrates a diagram of a wireless communications network in accordance with certain aspects of the present disclosure.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Although particular aspects are described herein, many variations and permutations of these aspects fall within the scope of the disclosure. Although some benefits and advantages of the described aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following description of aspects. The detailed description and drawings are merely illustrative of the disclosure rather than limiting.

An Example Wireless Communication System

The techniques described herein may be used for various broadband wireless communication systems, including communication systems that are based on an orthogonal multiplexing scheme. Examples of such communication systems include Spatial Division Multiple Access (SDMA), Time Division Multiple Access (TDMA), Orthogonal Frequency Division Multiple Access (OFDMA) systems, Single-Carrier Frequency Division Multiple Access (SC-FDMA) systems, and so forth. An SDMA system may utilize sufficiently different directions to simultaneously transmit data belonging to multiple user terminals. A TDMA system may allow multiple user terminals to share the same frequency channel by dividing the transmission signal into different time slots, each time slot being assigned to different user terminal. A TDMA system may implement GSM or some other standards known in the art. An OFDMA system utilizes orthogonal frequency division multiplexing (OFDM), which is a modulation technique that partitions the overall system bandwidth into multiple orthogonal sub-carriers. These sub-carriers may also be called tones, bins, etc. With OFDM, each sub-carrier may be independently modulated with data. An OFDM system may implement IEEE 802.11 or some other standards known in the art. An SC-FDMA system may utilize interleaved FDMA (IFDMA) to transmit on sub-carriers that are distributed across the system bandwidth, localized FDMA (LFDMA) to transmit on a block of adjacent sub-carriers, or enhanced FDMA (EFDMA) to transmit on multiple blocks of adjacent sub-carriers. In general, modulation symbols are sent in the frequency domain with OFDM and in the time domain with SC-FDMA. A SC-FDMA system may implement 3GPP-LTE ($3^{rd}$ Generation Partnership Project Long Term Evolution) or other standards.

The teachings herein may be incorporated into (e.g., implemented within or performed by) a variety of electronic devices, such as wired or wireless apparatuses (e.g., nodes). In some aspects, a wireless node implemented in accordance with the teachings herein may comprise an access point or an access terminal.

An access point ("AP") may comprise, be implemented as, or known as a NodeB, Radio Network Controller ("RNC"), eNodeB, Base Station Controller ("BSC"), Base Transceiver Station ("BTS"), Base Station ("BS"), Transceiver Function ("TF"), Radio Router, Radio Transceiver, Basic Service Set ("BSS"), Extended Service Set ("ESS"), Radio Base Station ("RBS"), or some other terminology.

An access terminal ("AT") may comprise, be implemented as, or known as an access terminal, a subscriber station, a subscriber unit, a mobile station, a remote station, a remote terminal, a user terminal, a user agent, a user device, user equipment, a user station, or some other terminology. In some implementations an access terminal may comprise a cellular telephone, a cordless telephone, a Session Initiation Protocol ("SIP") phone, a wireless local loop ("WLL") station, a personal digital assistant ("PDA"), a handheld device having wireless connection capability, a Station ("STA"), or some other suitable processing device connected to a wireless modem. Accordingly, one or more aspects taught herein may be incorporated into a phone (e.g., a cellular phone or smart phone), a computer (e.g., a laptop), a portable communication device, a portable computing device (e.g., a personal data assistant), an entertainment device (e.g., a music or video device, or a satellite radio), a global positioning system device, or any other suitable device that is configured to communicate via a wireless or wired medium. In some aspects the node is a wireless node. Such wireless node may provide, for example, connectivity for or to a network (e.g., a wide area network such as the Internet or a cellular network) via a wired or wireless communication link.

FIG. 1 illustrates a multiple-access multiple-input multiple-output (MIMO) system 100 with access points 110 and user terminals 120a through 120i. For simplicity, only one access point (AP) 110 is shown in FIG. 1. An access point 110 is generally a fixed station that communicates with the user terminals 120a-i and may also be referred to as a base station or a wireless device, or using some other terminology. An STA or user terminal 120a-i may be fixed or mobile and may also be referred to as a mobile station or a wireless device, or using some other terminology. For simplicity, this device is referred to as a user terminal (UT) 120a-i. The AP 110 may communicate with one or more UT 120a-i at any given moment on the downlink and uplink. The downlink (i.e., forward link) is the communication link from the access point 110 to the user terminals 120a-i, and the uplink (i.e., reverse link) is the communication link from the user terminals 120 to the access point 110. A user terminal 120a-i may also communicate peer-to-peer with another user terminal 120a-i. A system controller 130 couples to and provides coordination and control for the access points 110.

While portions of the following disclosure will describe user terminals 120 capable of communicating via Spatial Division Multiple Access (SDMA), for certain aspects, the UT 120 may also include some user terminals that do not support SDMA. Thus, for such aspects, the AP 110 may be configured to communicate with both SDMA and non-SDMA user terminals 120. This approach may conveniently allow older versions of user terminals ("legacy" stations) that do not support SDMA to remain deployed in an enterprise, extending their useful lifetime, while allowing newer SDMA user terminals 120 to be introduced as deemed appropriate.

The system 100 employs multiple transmit and multiple receive antennas for data transmission on the downlink and uplink. The AP 110 is equipped with $N_{ap}$ antennas and represents the multiple-input (MI) for downlink transmissions and the multiple-output (MO) for uplink transmissions. A set of K selected UTs 120 collectively represents the multiple-output for downlink transmissions and the multiple-input for uplink transmissions. For pure SDMA, it is desired to have $N_{ap} \leq K \leq 1$ if the data symbol streams for the K user terminals are not multiplexed in code, frequency or time by some means. K may be greater than $N_{ap}$ if the data symbol streams can be multiplexed using TDMA technique, different code channels with CDMA, disjoint sets of sub-bands with OFDM, and so on. Each selected user terminal 120 may transmit user-specific data to and/or receive user-specific data from the access point 110. In general, each selected user terminal 120 may be equipped with one or multiple antennas (i.e., $N_{ut} \geq 1$). The K selected user terminals 120 can have the same number of antennas, or one or more user terminals 120 may have a different number of antennas.

The SDMA system 100 may be a time division duplex (TDD) system or a frequency division duplex (FDD) system. For a TDD system, the downlink and uplink share the same frequency band. For an FDD system, the downlink and uplink use different frequency bands. The system 100 may also utilize a single carrier or multiple carriers for transmission. Each user terminal 120 may be equipped with a single antenna (e.g., in order to keep costs down) or multiple antennas (e.g., where the additional cost can be supported). The system 100 may also be a TDMA system if the user terminals 120 share the same frequency channel by dividing transmission/reception into different time slots, where each time slot may be assigned to a different UT 120.

Figure 2:
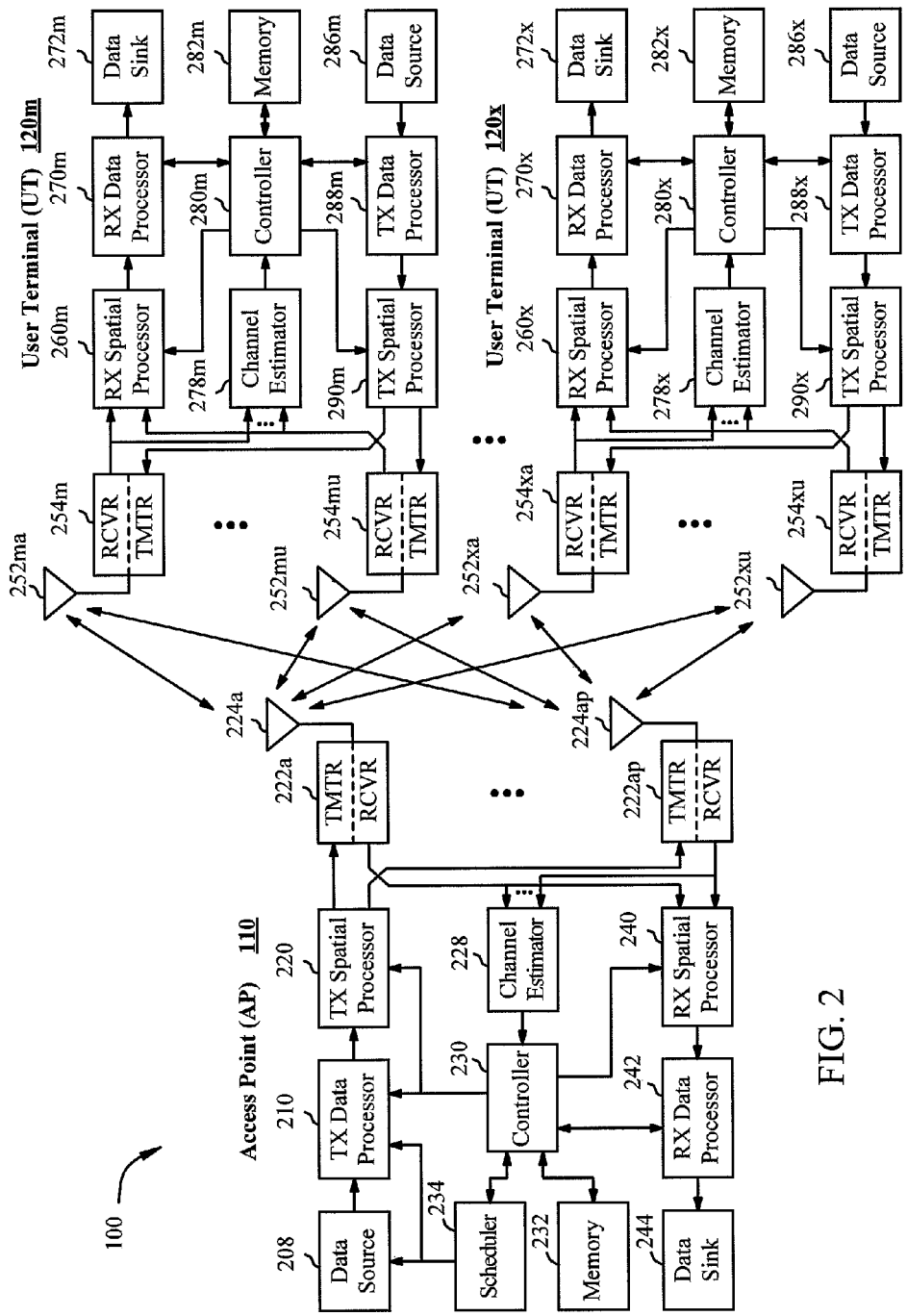
FIG. 2 illustrates a block diagram of an example access point and user terminals in accordance with certain aspects of the present disclosure.

FIG. 2 illustrates a block diagram of the AP 110 and two UTs 120m and 120x in MIMO system 100. The AP 110 is equipped with $N_t$ antennas 224a through 224ap. The UT 120m is equipped with $N_{ut,m}$ antennas 252ma through 252mu, and the UT 120x is equipped with $N_{ut,x}$ antennas 252xa through 252xu. The AP 110 is a transmitting entity for the downlink and a receiving entity for the uplink. The UT 120 is a transmitting entity for the uplink and a receiving entity for the downlink. As used herein, a "transmitting entity" is an independently operated apparatus or device capable of transmitting data via a wireless channel, and a "receiving entity" is an independently operated apparatus or device capable of receiving data via a wireless channel. In the following description, the subscript "dn" denotes the downlink, the subscript "up" denotes the uplink, $N_{up}$ user terminals are selected for simultaneous transmission on the uplink, and $N_{dn}$ user terminals are selected for simultaneous transmission on the downlink. $N_{up}$ may or may not be equal to $N_{dn}$, and $N_{up}$ and $N_{dn}$ may be static values or may change for each scheduling interval. Beam-steering or some other spatial processing technique may be used at the AP 110 and/or the UT 120.

On the uplink, at each UT 120 selected for uplink transmission, a TX data processor 288 receives traffic data from a data source 286 and control data from a controller 280. Memory 282, which may include both read-only memory (ROM) and random access memory (RAM), provides instructions and data to the controller 280. The TX data processor 288 processes (e.g., encodes, interleaves, and modulates) the traffic data for the user terminal based on the coding and modulation schemes associated with the rate selected for the user terminal and provides a data symbol stream. A TX spatial processor 290 performs spatial processing on the data symbol stream and provides $N_{ut,m}$ transmit symbol streams for the $N_{ut,m}$ antennas. Each transmitter unit (TMTR) 254 receives and processes (e.g., converts to analog, amplifies, filters, and frequency upconverts) a respective transmit symbol stream to generate an uplink signal. $N_{ut,m}$ transmitter units 254 provide $N_{ut,m}$ uplink signals for transmission from $N_{ut,m}$ antennas 252, for example to transmit to the AP 110.

$N_{up}$ user terminals 120 may be scheduled for simultaneous transmission on the uplink. Each of these user terminals 120 may perform spatial processing on its respective data symbol stream and transmit its respective set of transmit symbol streams on the uplink to the AP 110.

At the AP 110, $N_{ap}$ antennas 224a through 224ap receive the uplink signals from all $N_{up}$ user terminals transmitting on the uplink. Each antenna 224 provides a received signal to a respective receiver unit (RCVR) 222. Each receiver unit 222 performs processing complementary to that performed by transmitter unit 254 and provides a received symbol stream. An RX spatial processor 240 performs receiver spatial processing on the $N_{ap}$ received symbol streams from $N_{ap}$ receiver units 222 and provides $N_{up}$ recovered uplink data symbol streams. The receiver spatial processing may be performed in accordance with the channel correlation matrix inversion (CCMI), minimum mean square error (MMSE), soft interference cancellation (SIC), or some other technique. Each recovered uplink data symbol stream is an estimate of a data symbol stream transmitted by a respective user terminal 120. An RX data processor 242 processes (e.g., demodulates, deinterleaves, and decodes) each recovered uplink data symbol stream in accordance with the rate used for that stream to obtain decoded data. The decoded data for each user terminal may be provided to a data sink 244 for storage and/or a controller 230 for further processing. Memory 232, which may include both read-only memory (ROM) and random access memory (RAM), provides instructions and data to the controller 230.

On the downlink, at the AP 110, a TX data processor 210 receives traffic data from a data source 208 for $N_{dn}$ user terminals scheduled for downlink transmission, control data from a controller 230, and possibly other data from a scheduler 234. The various types of data may be sent on different transport channels. TX data processor 210 processes (e.g., encodes, interleaves, and modulates) the traffic data for each user terminal based on the rate selected for that user terminal. The TX data processor 210 provides $N_{dn}$ downlink data symbol streams for the $N_{dn}$ user terminals. A TX spatial processor 220 performs spatial processing (such as a precoding or beamforming) on the $N_{dn}$ downlink data symbol streams, and provides $N_{ap}$ transmit symbol streams for the $N_{ap}$ antennas. Each transmitter unit 222 receives and processes a respective transmit symbol stream to generate a downlink signal. $N_{ap}$ transmitter units 222 may provide $N_{ap}$ downlink signals for transmission from $N_{ap}$ antennas 224, for example to transmit to the user terminals 120.

At each UT 120, $N_{ut,m}$ antennas 252 receive the $N_{ap}$ downlink signals from the AP 110. Each receiver unit 254 processes a received signal from an associated antenna 252 and provides a received symbol stream. An RX spatial processor 260 performs receiver spatial processing on $N_{ut,m}$ received symbol streams from $N_{ut,m}$ receiver units 254 and provides a recovered downlink data symbol stream for the UT 120. The receiver spatial processing may be performed in accordance with the CCMI, MMSE, or some other technique. An RX data processor 270 processes (e.g., demodulates, deinterleaves and decodes) the recovered downlink data symbol stream to obtain decoded data for the user terminal. The decoded data may be provided to a data sink 272 for storage and/or a controller 280 for further processing.

At each UT 120, a channel estimator 278 estimates the downlink channel response and provides downlink channel estimates, which may include channel gain estimates, SNR estimates, noise variance and so on. Similarly, a channel estimator 228 estimates the uplink channel response and provides uplink channel estimates for the AP 110. Controller 280 for each user terminal 120 typically derives the spatial filter matrix for the user terminal 120 based on the downlink channel response matrix $H_{dn,m}$ for that user terminal 120. Controller 230 derives the spatial filter matrix for the access point 110 based on the effective uplink channel response matrix $H_{up,eff}$. The controller 280 for each user terminal 120 may send feedback information (e.g., the downlink and/or uplink eigenvectors, eigenvalues, SNR estimates, and so on) to the AP 110. The controllers 230 and 280 may also control the operation of various processing units at the AP 110 and UT 120, respectively.

Figure 3:
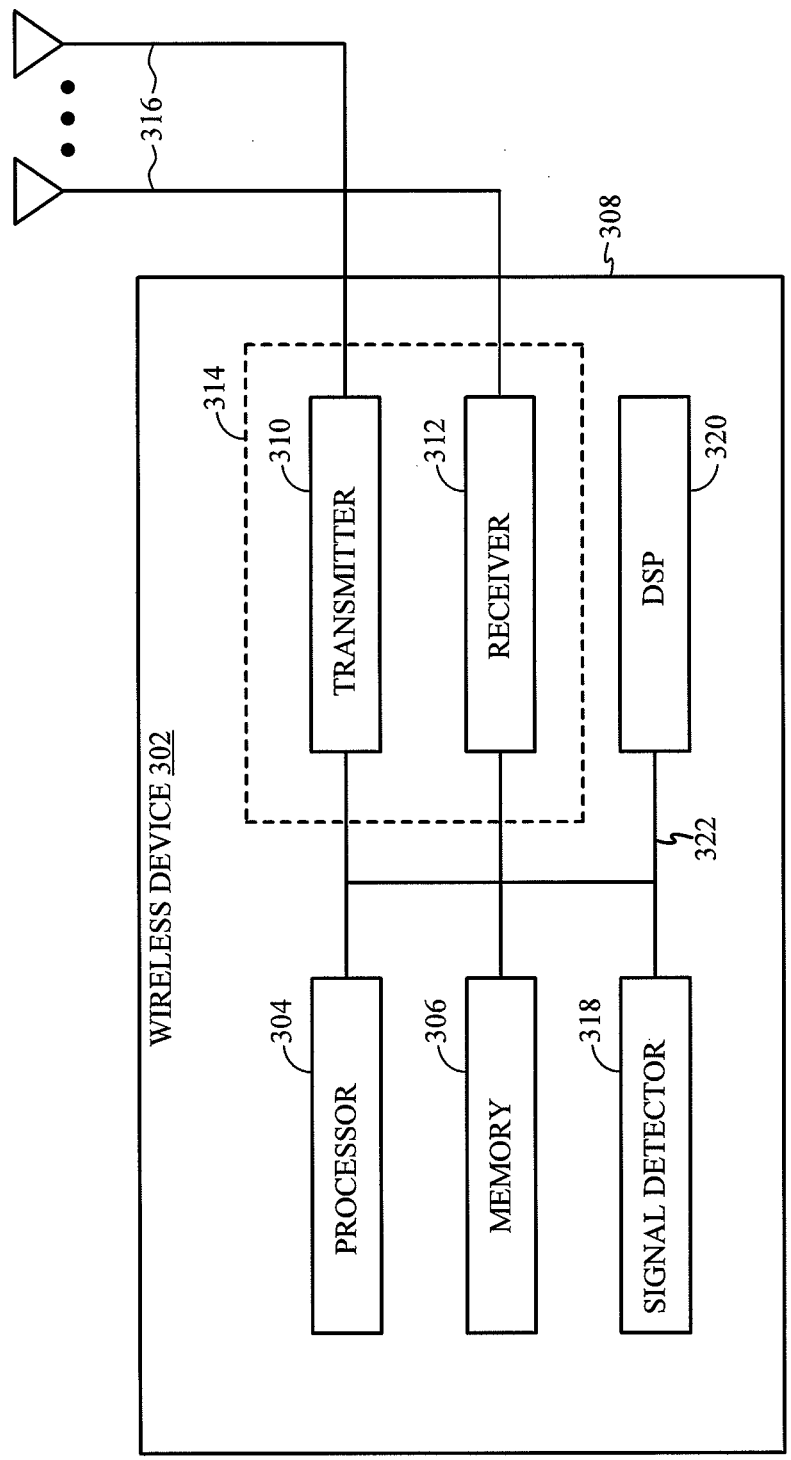
FIG. 3 illustrates a block diagram of an example wireless device in accordance with certain aspects of the present disclosure.

FIG. 3 illustrates various components that may be utilized in a wireless device 302 that may be employed within the wireless communication system 100. The wireless device 302 is an example of a device that may be configured to implement the various methods described herein. The wireless device 302 may implement an AP 110 or a UT 120.

The wireless device 302 may include a processor 304 which controls operation of the wireless device 302. The processor 304 may also be referred to as a central processing unit (CPU). Memory 306, which may include both read-only memory (ROM) and random access memory (RAM), provides instructions and data to the processor 304. A portion of the memory 306 may also include non-volatile random access memory (NVRAM). The processor 304 may perform logical and arithmetic operations based on program instructions stored within the memory 306. The instructions in the memory 306 may be executable to implement the methods described herein.

The processor 304 may comprise or be a component of a processing system implemented with one or more processors. The one or more processors may be implemented with any combination of general-purpose microprocessors, microcontrollers, digital signal processors (DSPs), field programmable gate array (FPGAs), programmable logic devices (PLDs), controllers, state machines, gated logic, discrete hardware components, dedicated hardware finite state machines, or any other suitable entities that can perform calculations or other manipulations of information.

The processing system may also include machine-readable media for storing software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the one or more processors, cause the processing system to perform the various functions described herein.

The wireless device 302 may also include a housing 308 that may include a transmitter 310 and a receiver 312 to allow transmission and reception of data between the wireless device 302 and a remote location. The transmitter 310 and receiver 312 may be combined into a transceiver 314. A single or a plurality of transmit antennas 316 may be attached to the housing 308 and electrically coupled to the transceiver 314. The wireless device 302 may also include (not shown) multiple transmitters, multiple receivers, and multiple transceivers.

The wireless device 302 may also include a signal detector 318 that may be used in an effort to detect and quantify the level of signals received by the transceiver 314. The signal detector 318 may detect such signals as total energy, energy per subcarrier per symbol, power spectral density and other signals. The wireless device 302 may also include a digital signal processor (DSP) 320 for use in processing signals.

The various components of the wireless device 302 may be coupled together by a bus system 322, which may include a power bus, a control signal bus, and a status signal bus in addition to a data bus.

In some aspects, the wireless system 100 illustrated in FIG. 1 operates in accordance with IEEE 802.11ah wireless communications standard. The IEEE 802.11 ah represents an IEEE 802.11 amendment that allows use with low transmit power IEEE 802.11 wireless networks. The IEEE 802.11ah standard may also sometimes be referred to as the Sub 1 GHz wireless communications standard. The IEEE 802.11 ah standard is targeted at enabling sensor type of applications. In these applications, the sensor often has a low transmit power capability.

In other 802.11 standards, different devices may support different communication data rates, Further a device, such as UT 120, may provide to a network device, such as AP 110, the set of MCS that is supported by the UT 120. Accordingly, the AP 110 knows which MCS will be used for communication with the UT 120.

Figure 4:
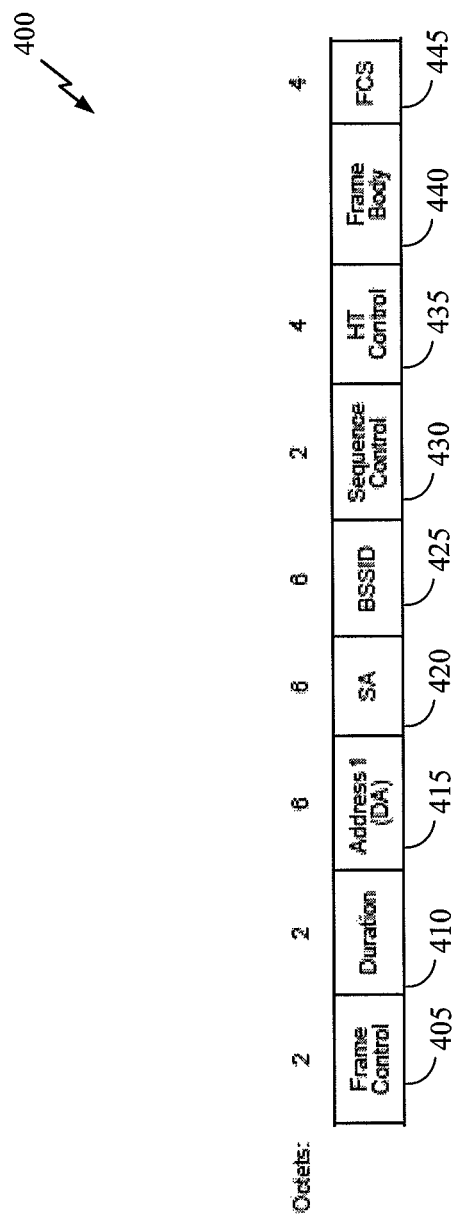
FIG. 4 illustrates an example of a management packet.

FIG. 4 illustrates an example of a management packet 400. As shown, the management packet includes a frame control (fc) field 405 of 2 bytes, a duration (dur) field 410 of 2 bytes, and address 1 (destination address (da)) field 415 of 6 bytes, an address 2 (sender address (sa)) field 420 of 6 bytes, a basic service set identifier (BSSID) field 425 of 6 bytes, a sequence control (sc) field 430 of 2 bytes, an HT control field 435 of 4 bytes, a frame body 440 of variable size, and a frame check sequence field 445 of 4 bytes. In some aspects, where the management packet 400 is communicated for devices supporting HT, but not VHT, the HT control field 435 may include an HT capabilities element, but not a VHT capabilities element. In some aspects, where the management packet 400 is communicated for devices supporting VHT (and therefore also support HT) the HT control field 435 may include both an HT capabilities element and a VHT capabilities element. In some aspects, devices that support HT communication may transmit information about the supported set of MCS in a HT capabilities element of a HT control field (e.g., HT control field 435) of a management packet (e.g., management packet 400). For example, the HT capabilities element includes a plurality of bits that define a set of MCS index values. The mapping of MCS index values to actual MCSs may be defined by the standard. For example, a first bit may map to a first MCS and a second bit may map to a second MCS. Depending on the value of the bits received in the HT control field 435, the AP 110 can determine which mapped MCS is supported, and which mapped MCS is not supported.

Further in some aspects, electronic devices that support VHT communication transmit information about the supported set of MCS in a VHT capabilities element of an HT control field (e.g., HT control field 435) of a management packet (e.g., management packet 400). The VHT capabilities element does not correspond to a mapping of individual supported MCS. Rather, the VHT capabilities element indicates the maximum MCS that is supported per each number of spatial streams. An AP 110 receiving the VHT capabilities element assumes the UT 120 supports all MCS for a given spatial stream that are equal to or less than the maximum MCS indicated as supported for the given spatial stream. Furthermore, some MCS are assumed to be implicitly supported and no indication is available to indicate they are not supported.

In some situations, AP 110 may be able to transmit to a client with a given MCS, based on the AP's 110 transmit power capability. However, a low transmit power UT 120 may not be able to transmit to AP 110 with the same, or even a similar MCS. The UT 120 may only want to support all MCSs less than a maximum MCS supported by the UT 120 for a given spatial stream, based on the low transmit power of UT 120. For example, MCSs may have an order based on the effective bit rate data that can be sent using the particular MCS. The greater the effective bit rate, the "greater" the MCS.

Accordingly, herein are described systems and methods for allowing for an UT 120 to indicate which MCS are supported by the UT 120 to the AP 110. For example, a UT 120 that has a low transmit power capability receives a frame from an AP 110 using a particular MCS. In some situations, the UT 120, based on its low transmit power, may be unable to respond using an MCS at or near the MCS of AP 110. Because of the imbalance or difference between transmit power between AP 110 and UT 120, difficulties in communication may arise.

In one aspect, UT 120 is free to select the response rate or response MCS with which it responds to the frame received from AP 110. UT 120 receives data identifying a first MCS from AP 110. The term data identifying an MCS, or other similar terms, as used herein, may refer to, for example, communicating in a known MCS, sending information in a frame indicating a known MCS, or other commonly known methods for indicating an MCS. After selecting a second MCS, UT 120 then transmits data identifying the selected MCS to the AP 110, and a communication link may be established.

In some aspects, UT 120 selects an MCS which is a predetermined quantity, or N, MCSs lower than that received from AP 110, and communicates in response using the selected MCS. N, and thus the associated MCS, is selected based on the characteristics of UT 120, and the MCS transmitted by AP 110 and received by UT 120.

In some aspects, N is fixed, being defined, for example, by the typical power imbalance between IEEE 802.11ah nodes. AP 110 may have a power amplifier transmitting at 20 dBm. UT 120 may have no power amplifier, and is transmitting at 0 dBm. The difference between these transmit power levels is sometimes referred to as the power imbalance. By knowing what the typical power imbalance is between devices in a network using IEEE 802.11ah, the relation between MCSs can be fixed and established. Thus, upon receiving data according to an MCS from AP 110, UT 120 would select an MCS which is the fixed value of N lower than the MCS used by AP 110, and communicate with AP 110 according to the selected MCS.

In some aspects, the predetermined quantity, or N, is a function of transmit power between AP 110 and UT 120. Each device on the mobile network declares its transmit power at association. For example, AP 110 transmits at 20 dBm, and UT 120 transmits at 10 dBm. The indications of transmit power are sent and received by AP 110 and UT 120 at the time of association between the two devices. In the present example, the power imbalance is 10 dBm, which corresponds to a defined value for N. Once N is known, UT 120 selects an MCS which is N lower than the MCS used by AP 110. Although one example for determining N is provided here, it will be understood by those of skill in the art that N may be any of a range of values which correspond to, or that can be calculated from, a range of possible power imbalances between an AP 110 and a UT 120. In some aspects, the indication of transmit power is provided by either AP 110 or UT 120, or both, in a field in a capability element in the association request/association response frames.

In some aspects, N may be a value indicated to UT 120 by AP 110. In some aspects, N maybe a value indicated to AP 110 by UT 120. The value of N may be included in a field or information element in an association request frame. In some aspects, the indication of N may be included in a management frame sent after association.

In some aspects, an MCS selection criteria requires that the selected MCS not exceed a particular value X. In contrast to selecting an MCS which is N lower than the received MCS, MCS selection is constrained to MCSs which are less than X. Similar to N as described above, X may refer to a datarate, bitrate, modulation coding scheme, or similar parameter. The value for X may be established similar to the value for N described elsewhere herein. For example, X may be fixed, based on the typical power imbalance between AP 110 and a UT 120. X may be a function of transmit power imbalance, or may be indicated by either AP 110 or UT 120.

In some aspects, the AP 110 or UT 120 may indicate the exact relation between each received MCS and the allowed response MCSs within the BSSBasicMCSSet, corresponding to each value of the power imbalance. Thus, based on the power imbalance, UT 120 selects the MCS within the set of allowed response MCSs corresponding to the power imbalance. In some aspects, AP 110 may be configured to provide 2 BSS Basic Set tables to be used in control response: one set used for high transmit power devices and one set used for a low transmit power devices. When a low transmit power UT 120 receives a frame from AP 110, the exact relation between the received MCS and the allowed MCSs in the corresponding low transmit power BSS Basic set table are identified. A low transmit power UT 120 then selects a low MCS from the low transmit power BSS Basic Set table.

In some aspects, AP 110 may indicate the exact relationship between the MCS of AP 110 and allowed response MCSs to UT 120, after knowing the power imbalance. In some aspects, UT 120 may indicate the exact relationship of the MCS of AP 110 and UT 120 after knowing the power imbalance. UT 120 may know the power imbalance based on a beacon or probe response from AP 110. The indications of the exact relationship between MCS of AP 110 and allowed response MCSs may be transmitted or included in a field or information element in the association request or response frame. In some aspects, the exact relationship may be included in a management frame sent after association.

The examples above describe the relationship between an AP 110 and a UT 120. However, the description is not limited to only communication between an AP 110 and a UT 120. A person skilled in the art would understand that the same description could be applied to two peer UTs or peer APs.

Figure 5A:
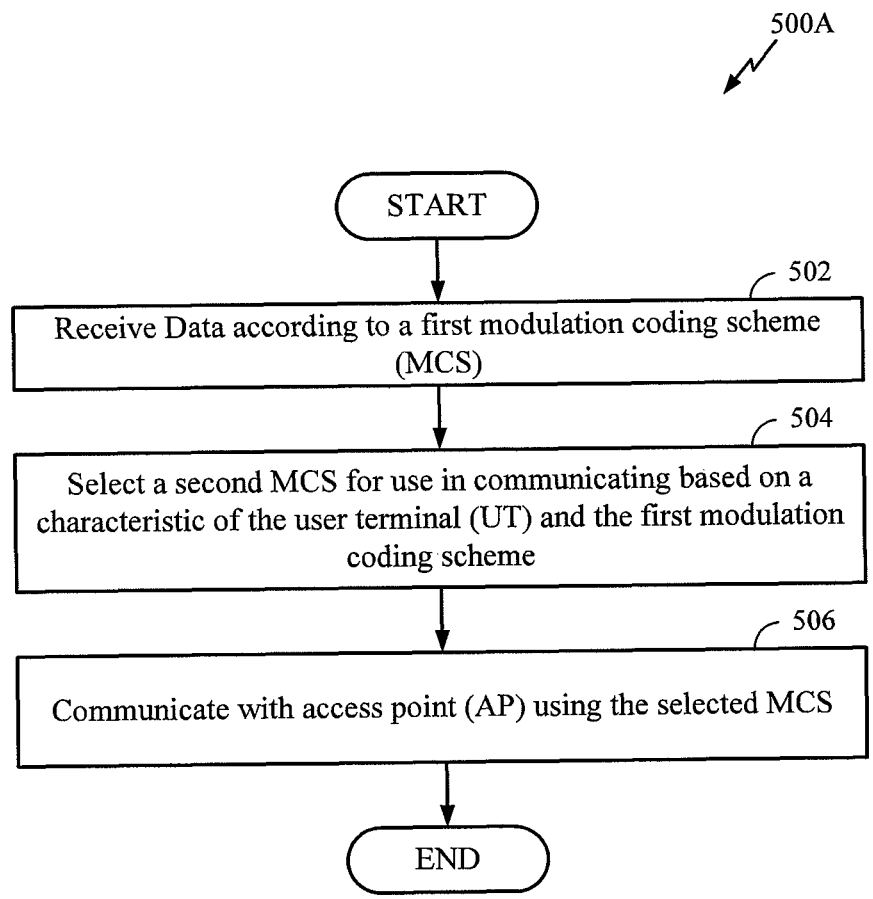
FIGS. 5A and 5B are flowcharts of example methods for communication.

FIG. 5A is a flowchart of an example method 500A for communication. The method is described as implemented by the UT 120. However, as would be understood by one of ordinary skill in the art, the method may be implemented by one or more other suitable electronic devices.

At a block 502, the UT 120 receives information identifying a first MCS. The MCS may be received from AP 110, or another peer UT 120. The information identifying the first MCS may be received in an association request frame or in a management frame.

At a block 504, the UT 120 selects a second MCS for use in communicating. The selected MCS is based on the characteristics of UT 120, e.g., transmit power, device type, or similar feature, and the first modulation coding scheme. An exemplary device type is whether the electronic device is functioning in the communication network as an AP 110 or a UT 120. Another exemplary device type is whether the electronic device is communicating in the communication network as a UT 120 to an AP 110 or as a UT 120 to another. UT 120 in a peer-to-peer communication. Transmit power imbalance between AP 110 and UT 120 may be used as a basis for selecting the MCS. As described elsewhere herein, MCS may be an MCS value of N lower than the received MCS, or may be constrained to be lower than X, and may be based on power imbalance. The values for N or X corresponding to a particular power imbalance may be preprogrammed in UT 120, such as at the time of manufacture, or updated, such as through software or firmware updates.

At a block 506, the UT 120 transmits data identifying or using the selected MCS to AP 110.

Figure 5B:
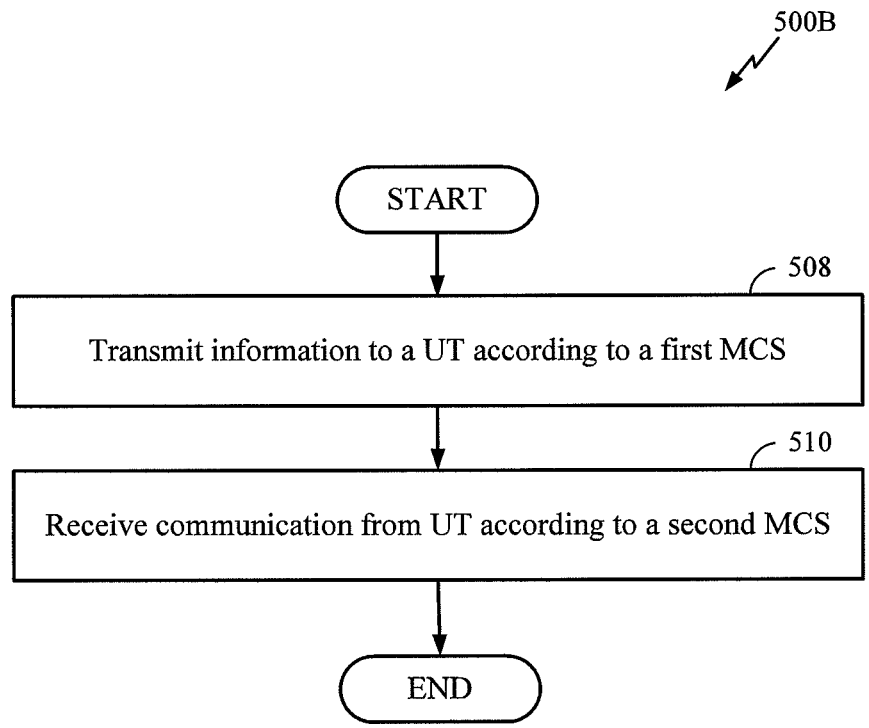

FIG. 5B is a flowchart of an example method 500B for communication. The method is described as implemented by the AP 110. However, the method may be implemented by one or more other suitable electronic devices as would be understood by one of ordinary skill in the art.

At a block 508, the AP 110 transmits information identifying a first MCS to UT 120. The information transmitted may comprise information regarding the transmit power of AP 110, the MCS being used, the set of allowable response MCSs, information about the power imbalance, and/or a predetermined quantity to be used for selecting the response MCS. This information may be included in an association response frame, or in a management frame sent after association.

At a block 510, the AP 110 receives information identifying the selected MCS from UT 110 using the selected MCS.

Figure 6:
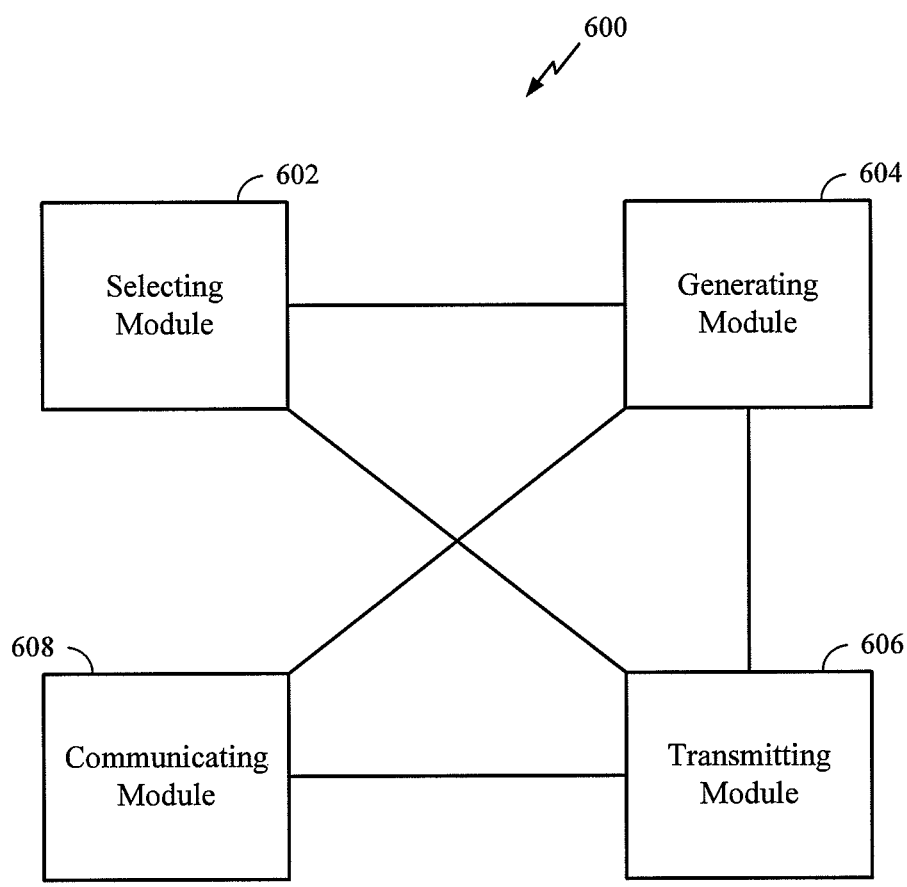
FIG. 6 illustrates an aspect of a user terminal for use within the network of FIG. 1.

FIG. 6 illustrates an aspect of a UT 600 for use within the network of FIG. 1. The UT 600 may comprise any of the user terminals 120 illustrated in FIG. 1 or FIG. 2. As discussed above, the UT 600 may be implemented as an electronic device, for example as a wireless device 302 illustrated in FIG. 3. The UT 600 may be used to communicate with an AP as described above with respect to FIGS. 4 and 5A.

The UT 600 comprises a selecting module 602 for determining the MCS the UT 600 will use to communicate with a particular access point 110. The selecting module 602 may be configured to perform one or more of the functions discussed above with respect to the block 504 illustrated in FIG. 5A. The selecting module 602 may correspond to one or more of the processor 304 and the DSP 320 illustrated in FIG. 3. The UT 600 further comprises a transmitting module 606 for wirelessly transmitting the generated packet. The transmitting module 606 may be configured to perform one or more of the functions discussed above with respect to the block 506 illustrated in FIG. 5A. The transmitting module 606 may correspond to the transmitter 310. The UT 600 further comprises a generating module 604. The generating module 604 may be configured to store or generate a predetermined quantity, N, based on a transmit power imbalance, used in selecting the MCS, as described elsewhere herein. The generating module 604 may also provide the MCS to be used based on the relation between a received MCS and the allowed response MCSs for a given power imbalance. The functions of generating module 604 may be included in the functions described above with respect to the block 504 illustrated in FIG. 5A. The UT 600 further comprises a communicating module 608 for wirelessly communicating with another device using the supported MCS. The communicating module 608 may be configured to perform one or more of the functions discussed above with respect to the block 510 illustrated in FIG. 5B. The communicating module 608 may correspond to the transceiver 314.

Figure 7:
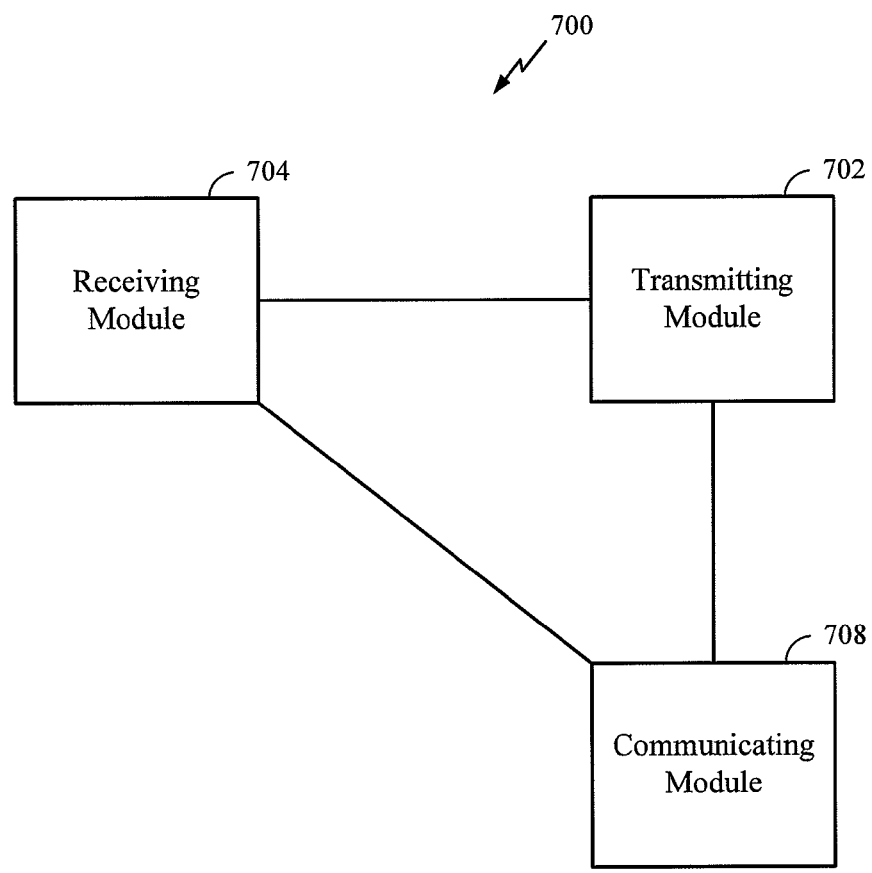
FIG. 7 illustrates an aspect of an access point for use within the network of FIG. 1.

FIG. 7 illustrates an aspect of an AP 700 for use within the network of FIG. 1. The AP 700 may comprise any of access points 110 illustrated in FIG. 1 or FIG. 2. As discussed above, the AP 700 may be implemented as an electronic device, for example as a wireless device 302 illustrated in FIG. 3. The AP 700 may be used to communicate with a UT as described above with respect to FIGS. 4 and 5B.

The AP 700 comprises a transmitting module 702 for receiving a packet indicative of the supported MCS of another device. The transmitting module 702 may be configured to perform one or more of the functions discussed above with respect to the block 508 illustrated in FIG. 5B. The transmitting module 702 may correspond to the transmitter 310. The AP 700 further comprises a receiving module 704 for determining which MCS are supported by the other device based on the received packet. The receiving module 704 may be configured to perform one or more of the functions discussed above with respect to the block 510 illustrated in FIG. 5B. The receiving module 704 may correspond to the receiver 312. The AP 700 further comprises a communicating module 708 for wirelessly communicating with the other device using the supported MCS. The communicating module 708 may correspond to the transceiver 314.

Those of skill in the art will appreciate various circuits, chips, modules, and/or components, which may comprise either software or hardware or both, that may be used to implement the modules described above with respect to the UT 600 and/or the AP 700. One or more of the modules of the UT 600 and/or the AP 700 may be partially or wholly implemented in the processor 304 illustrated in FIG. 3.

Although described separately, it is to be appreciated that functional blocks described with respect to the UT 600 and the AP 700 need not be separate structural elements. Similarly, one or more of the functional blocks or portions of the functionality of various blocks may be embodied in a single chip. Alternatively, the functionality of a particular block may be implemented on two or more chips. In addition, additional modules or functionality may be implemented in the UT 600 and/or the AP 700. Similarly, fewer modules or functionalities may be implemented in the UT 600 and/or the AP 700, and the components of the UT 600 and/or the AP 700 may be arranged in any of a plurality of configurations. Additional or fewer couplings between the various modules illustrated in FIGS. 2, 3, 6 and 7 or between additional modules may be implemented.

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations, module, or steps illustrated in Figures, those operations may have corresponding counterpart means-plus-function components. For example, a user terminal may comprise means for receiving a message comprising a null data packet announcement, the null data packet announcement comprising a sequence number, means for determining channel state information based at least in part on a null data packet associated with the null data packet announcement, and means for transmitting a message comprising the sequence number of the null data packet announcement and at least one parameter of the determined channel state information.

An apparatus for communicating in a wireless network may comprise means for receiving. The apparatus may further comprise means for identifying. The apparatus may further comprise means for communicating. The apparatus may include AP 110, as illustrated in FIG. 1.

The means for receiving may be configured to perform one or more of the functions discussed above with respect to the blocks 508 and 512 illustrated in FIG. 5B. The means for receiving may correspond to one or more of the receiver 312, the transceiver 314, the processor 304, and the memory 306, discussed above with respect to FIG. 3. The means for identifying may be configured to perform one or more of the functions discussed above with respect to the block 510 illustrated in FIG. 5B. The means for identifying may correspond to one or more of the processor 304 and the memory 306, discussed above with respect to FIG. 3. The means for communicating may be configured to perform one or more of the functions discussed above with respect to the blocks 508 and 512 illustrated in FIG. 5B. The means for communicating may correspond to one or more of the transmitter 310, the transceiver 314, the processor 304, and the memory 306, discussed above with respect to FIG. 3.

An apparatus for communicating in a wireless network may comprise means for generating information identifying at least one first modulation coding scheme. The apparatus may further comprise means for generating information identifying at least one second modulation coding scheme. The apparatus may further comprise means for transmitting. The apparatus may further comprise means for communicating. The apparatus may include any of UT 120a-i, as illustrated in FIG. 1.

The means for generating information identifying at least one first modulation coding scheme may be configured to perform one or more of the functions discussed above with respect to the blocks 502 and 504 illustrated in FIG. 5A. The means for generating information identifying at least one first modulation coding scheme may correspond to one or more of the processor 304 and the memory 306, discussed above with respect to FIG. 3. The means for generating information identifying at least one second modulation coding scheme may be configured to perform one or more of the functions discussed above with respect to the blocks 502 and 504 illustrated in FIG. 5A. The means for generating information identifying at least one second modulation coding scheme may correspond to one or more of the processor 304 and the memory 306, discussed above with respect to FIG. 3. The means for transmitting may be configured to perform one or more of the functions discussed above with respect to the block 506 illustrated in FIG. 5A. The means for transmitting may correspond to one or more of the transmitter 310, the transceiver 314, the processor 304, and the memory 306, discussed above with respect to FIG. 3. The means for communicating may correspond to one or more of the transmitter 310, the transceiver 314, the processor 304, and the memory 306, discussed above with respect to FIG. 3.

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various operations of methods described above may be performed by any suitable means capable of performing the operations, such as various hardware and/or software component(s), circuits, and/or module(s). Generally, any operations illustrated in the Figures may be performed by corresponding functional means capable of performing the operations.

The various illustrative logical blocks, modules and circuits described in connection with the present disclosure may be implemented or performed with a general purpose processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. A general purpose processor may be a microprocessor, but in the alternative, the processor may be any commercially available processor, controller, microcontroller or state machine. A processor may also be implemented as a combination of computing devices, e.g., a combination of a DSP and a microprocessor, a plurality of microprocessors, one or more microprocessors in conjunction with a DSP core, or any other such configuration.

In one or more aspects, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Thus, in some aspects computer readable medium may comprise non-transitory computer readable medium (e.g., tangible media). In addition, in some aspects computer readable medium may comprise transitory computer readable medium (e.g., a signal). Combinations of the above should also be included within the scope of computer-readable media.

If implemented in hardware, an example hardware configuration may comprise a processing system in a wireless node. The processing system may be implemented with bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a UT 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further.

In a hardware implementation, machine-readable media may be part of the processing system separate from the processor. However, as those skilled in the art will readily appreciate, the machine-readable media, or any portion thereof, may be external to the processing system. By way of example, the machine-readable media may include a transmission line, a carrier wave modulated by data, and/or a computer product separate from the wireless node, all which may be accessed by the processor through the bus interface. Alternatively, or in addition, the machine-readable media, or any portion thereof, may be integrated into the processor, such as the case may be with cache and/or general register files.

The processing system may be configured as a general-purpose processing system with one or more microprocessors providing the processor functionality and external memory providing at least a portion of the machine-readable media, all linked together with other supporting circuitry through an external bus architecture. Alternatively, the processing system may be implemented with an ASIC (Application Specific Integrated Circuit) with the processor, the bus interface, the user interface in the case of an access terminal), supporting circuitry, and at least a portion of the machine-readable media integrated into a single chip, or with one or more FPGAs (Field Programmable Gate Arrays), PLDs (Programmable Logic Devices), controllers, state machines, gated logic, discrete hardware components, or any other suitable circuitry, or any combination of circuits that can perform the various functionality described throughout this disclosure. Those skilled in the art will recognize how best to implement the described functionality for the processing system depending on the particular application and the overall design constraints imposed on the overall system.

The machine-readable media may comprise a number of software modules. The software modules include instructions that, when executed by the processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware or any combination thereof. If implemented in software, the functions may be stored as one or more instructions on a computer-readable medium. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, include compact disc (CD), laser disc, optical disc, digital versatile disc (DVD), floppy disk, and Blu-ray® disc where disks usually reproduce data magnetically, while discs reproduce data optically with lasers.

Thus, certain aspects may comprise a computer program product for performing the operations presented herein. For example, such a computer program product may comprise a computer readable medium having instructions stored (and/or encoded) thereon, the instructions being executable by one or more processors to perform the operations described herein. For certain aspects, the computer program product may include packaging material.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

While the foregoing is directed to aspects of the present disclosure, other and further aspects of the disclosure may be devised without departing from the basic scope thereof, and the scope thereof is determined by the claims that follow.

The invention claimed is:

1. A method for communicating in a wireless network by an electronic device, the method comprising:
   receiving data identifying a first modulation coding scheme from a transmitter; and
   selecting a second modulation coding scheme based on a characteristic of the electronic device including the first modulation coding scheme, wherein information identifying the second modulation coding scheme is a predetermined numerical N quantity lower than the first modulation coding scheme, the second modulation coding scheme being a function of a power imbalance between the transmitter and the electronic device independent of actual transmit powers of the transmitter and the electronic device; and
   transmitting data identifying the second modulation coding scheme.

2. The method of claim 1, wherein the electronic device receives the predetermined numerical N quantity from the transmitter.

3. The method of claim 2, wherein the electronic device receives the predetermined numerical N quantity in an association request frame.

4. The method of claim 2, wherein the electronic device receives the predetermined numerical N quantity in a management frame sent after association.

5. The method of claim 1, wherein the electronic device provides the predetermined numerical N quantity.

6. The method of claim 1, wherein the second modulation coding scheme does not exceed a predetermined numerical X quantity.

7. The method of claim 6 wherein the predetermined numerical X quantity is a datarate or modulation code scheme order.

8. The method of claim 1 further comprising receiving data identifying a set of allowable modulation coding schemes.

9. The method of claim 8, wherein the set of allowable modulation coding schemes is based on a determined transmit power imbalance.

10. The method of claim 1, wherein the characteristic of the electronic device is further including a type of the electronic device, the type is based on whether the electronic device is functioning in the wireless network as an Access Point or a User Terminal.

11. The method of claim 1, wherein the characteristic of the electronic device is further including a type of the electronic device, the type is based on whether the electronic device is communicating in the wireless network as a User Terminal to an Access Point or a User Terminal to another User Terminal.

12. An apparatus for communicating in a wireless network by an electronic device comprising:
    a transceiver configured to receive data identifying a first modulation coding scheme;
    a processing system configured to select a second modulation coding scheme based on a characteristic of the electronic device including the first modulation coding scheme, wherein information identifying the second modulation coding scheme is a predetermined numerical N quantity lower than the first modulation coding scheme, the second modulation coding scheme being a function of a power imbalance between the transmitter and the electronic device independent of actual transmit powers of the transmitter and the electronic device; and
    wherein the transceiver is configured to transmit and/or receive data identifying the second modulation coding scheme.

13. The apparatus of claim 12, wherein the electronic device is configured to receive the predetermined numerical N quantity from the transceiver.

14. The apparatus of claim 13, wherein the electronic device is configured to receive the predetermined numerical N quantity in an association request frame.

15. The apparatus of claim 13, wherein the electronic device is configured to receive the predetermined numerical N quantity in a management frame sent after association.

16. The apparatus of claim 12, wherein the electronic device is configured to provide the predetermined numerical N quantity.

17. The apparatus of claim 12, wherein the second modulation coding scheme does not exceed a predetermined numerical X quantity.

18. The apparatus of claim 17, wherein the predetermined numerical X quantity is a datarate or modulation code scheme order.

19. The apparatus of claim 12, wherein the transceiver is configured to receive data identifying a set of allowable modulation coding schemes.

20. The apparatus of claim 19, wherein the set of allowable modulation coding schemes is based on a determined transmit power imbalance.

21. The apparatus of claim 12, wherein the characteristic of the electronic device is further including a type of the electronic device, the type is based on whether the electronic device is functioning in the wireless network as an Access Point or a User Terminal.

22. The apparatus of claim 12, wherein the characteristic of the electronic device is further including a type of the electronic device, the type is based on whether the electronic device is communicating in the wireless network as a User Terminal to an Access Point or a User Terminal to another User Terminal.

23. An apparatus for communicating in a wireless network by an electronic device, comprising:
    means for receiving data identifying a first modulation coding scheme from a transmitter;
    means for selecting a second modulation coding scheme based on a characteristic of the electronic device including the first modulation coding scheme, wherein information identifying the second modulation coding is a predetermined numerical N quantity lower than the first modulation coding scheme, the second modulation coding scheme being a function of a power imbalance between the transmitter and the electronic device independent of actual transmit powers of the transmitter and the electronic device; and
    means for communicating using the second modulation coding scheme.

24. The apparatus of claim 23, wherein the electronic device receives the predetermined numerical N quantity from the transmitter.

25. The apparatus of claim 24, wherein the electronic device receives the predetermined numerical N quantity in an association request frame.

26. The apparatus of claim 24, wherein the electronic device receives the predetermined numerical N quantity in a management frame sent after association.

27. The apparatus of claim 23, wherein the electronic device provides the predetermined numerical N quantity.

28. The apparatus of claim 23 wherein the second modulation coding scheme does not exceed the predetermined numerical N quantity.

29. The apparatus of claim 23 wherein the predetermined numerical N quantity is a datarate or modulation code scheme order.

30. The apparatus of claim 23 further comprising means for receiving data identifying a set of allowable modulation coding schemes.

31. The apparatus of claim 30, wherein the set of allowable modulation coding schemes is based on a determined transmit power imbalance.

32. The apparatus of claim 23, wherein the characteristic of the electronic device is further including a type of the electronic device, the type is based on whether the electronic device is functioning in the wireless network as an Access Point or a User Terminal.

33. The apparatus of claim 23, wherein the characteristic of the electronic device is further including a type of the electronic device, the type is based on whether the electronic device is communicating in the wireless network as a User Terminal to an Access Point or a User Terminal to another User Terminal.

34. A non-transitory computer-readable medium comprising code that, when executed, causes an apparatus to:
   receive data identifying a first modulation coding scheme from a transmitter;
   select a second modulation coding scheme based on a characteristic of the electronic device including the first modulation coding scheme, wherein information identifying the second modulation coding is a predetermined numerical N quantity lower than the first modulation coding scheme, the second modulation coding scheme being a function of a power imbalance between the transmitter and the electronic device independent of actual transmit powers of the transmitter and the electronic device; and
   transmit data identifying the second modulation coding scheme.

* * * * *